United States Patent
Li et al.

(10) Patent No.: US 12,132,178 B2
(45) Date of Patent: Oct. 29, 2024

(54) STIRRING MECHANISM FOR EXTRACTING LITHIUM FROM WASTE LIQUID OF LITHIUM IRON PHOSPHATE BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Aixia Li, Guangdong (CN); Haijun Yu, Guangdong (CN); Changdong Li, Guangdong (CN); Yinghao Xie, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/558,154

(22) PCT Filed: Jul. 15, 2022

(86) PCT No.: PCT/CN2022/106010
§ 371 (c)(1),
(2) Date: Oct. 30, 2023

(87) PCT Pub. No.: WO2023/231156
PCT Pub. Date: Dec. 7, 2023

(65) Prior Publication Data
US 2024/0332659 A1    Oct. 3, 2024

(30) Foreign Application Priority Data
Jun. 1, 2022   (CN) .......................... 202210610899.3

(51) Int. Cl.
*H01M 10/54* (2006.01)
*B01F 23/80* (2022.01)
(Continued)

(52) U.S. Cl.
CPC .......... *H01M 10/54* (2013.01); *B01F 23/808* (2022.01); *B01F 27/70* (2022.01); *B01F 35/75455* (2022.01)

(58) Field of Classification Search
CPC . H01M 10/54; B01F 23/808; B01F 35/75455; B01F 27/70
(Continued)

(56) References Cited

FOREIGN PATENT DOCUMENTS

| CN | 104689740 | 6/2015 |
|----|-----------|--------|
| CN | 206229233 | 6/2017 |

(Continued)

OTHER PUBLICATIONS

CN111009700A machine translation (Year: 2020).*
(Continued)

*Primary Examiner* — Matthew T Martin
*Assistant Examiner* — Paul Christian St Wyrough
(74) *Attorney, Agent, or Firm* — Leason Ellis LLP (57) ABSTRACT

Disclosed is a stirring mechanism for extracting lithium from a waste liquid of a lithium iron phosphate battery, including a pedestal, a clamping jaw and a stirring mechanism; the stirring mechanism includes a first motor, a rotating member and a stirring member; the rotating member includes a second motor, a connecting end and a rotating shaft; the rotating shaft includes an inner shaft and an outer shaft; the stirring member includes a jaw-shaped connecting base, a separating frame, a material guide wheel and a collecting frame; the jaw-shaped connecting base is connected to an outside lower end of the outer shaft; the separating frame is connected to a bottom end of the
(Continued)

jaw-shaped connecting base; the collecting frame is connected to a bottom portion of the separating frame; and the material guide wheel is fixed to a lower end of an inner cavity of the collecting frame and is connected with a bottom end of the inner shaft.

15 Claims, 4 Drawing Sheets

(51) Int. Cl.
    *B01F 27/70*     (2022.01)
    *B01F 35/75*     (2022.01)

(58) Field of Classification Search
    USPC .......................................................... 429/49
    See application file for complete search history.

(56) References Cited

FOREIGN PATENT DOCUMENTS

| | | | |
|---|---|---|---|
| CN | 206463842 | | 9/2017 |
| CN | 208517035 | | 2/2019 |
| CN | 111009700 | | 4/2020 |
| CN | 111009700 A | * | 4/2020 |
| CN | 210814826 U | * | 6/2020 |
| CN | 210855418 | | 6/2020 |
| CN | 111790285 | | 10/2020 |
| CN | 212269754 | | 1/2021 |
| CN | 214115126 | | 9/2021 |
| JP | 2000107580 | | 4/2000 |
| JP | 2017000933 | | 1/2017 |
| JP | 2017000933 A | * | 1/2017 |
| JP | 2021068685 | | 4/2021 |
| KR | 100895997 | | 5/2009 |

OTHER PUBLICATIONS

JP2017000933A machine translation (Year: 2017).*
Process Plant Network, @ 61 seconds; "pedestal"), a clamping jaw (Process Plant Network, @ 61 seconds (Year: 2019).*
Chinese Office Action in CN Application No. 202210610899.3 mailed Mar. 28, 2023, an English Translation attached herewith (7 pages).
International Search Report issued for the PCT application No. PCT/CN2022/106010 on Dec. 21, 2022 with English translation (6 pages).
Written Opinions of the International Searching Authority issued for the PCT application No. PCT/CN2022/106010 on Dec. 21, 2022 with English translation (4 pages).
First Search Report for Chinese family member. CN115178133A on Mar. 27, 2023with English translation.

* cited by examiner

STIRRING MECHANISM FOR EXTRACTING LITHIUM FROM WASTE LIQUID OF LITHIUM IRON PHOSPHATE BATTERY

CROSS-REFERENCE TO RELATED APPLICATION

This application is a national stage filing under 35 U.S.C. § 371 of international application number PCT/CN2022/106010, filed Jul. 15, 2022, which claims priority to Chinese patent application No. 202210610899.3 filed Jun. 1, 2022. The contents of these applications are incorporated herein by reference in their entirety.

TECHNICAL FIELD

The present disclosure relates to the technical field of waste battery recycling, and more particularly, to a stirring mechanism for extracting lithium from a waste liquid of a lithium iron phosphate battery.

BACKGROUND

Lithium iron phosphate battery is a lithium ion battery using lithium iron phosphate as a cathode material and carbon as an anode material. Due to the advantages of high working voltage, high energy density, long cycle life, good safety performance, low self-discharge rate and no memory effect, the lithium iron phosphate battery is widely used in the industry of new energy vehicles. With the upsurge of electrification in the automobile industry, people have begun to pay attention to the recycling of lithium iron phosphate batteries for vehicles in the future.

The recycling of the lithium iron phosphate battery is mainly divided into two stages, where the first stage is to crush a lithium iron phosphate battery pack into lithium iron phosphate powder; and the second stage is to recycle the lithium iron phosphate powder to form a lithium salt product such as lithium carbonate by a physical or chemical method. A lithium element in the waste liquid of the existing lithium iron phosphate battery is mostly recycled by a chemical method—wet extraction, which means that the waste liquid of the lithium iron phosphate battery is mixed with other chemical solutions for reaction, other metal elements (such as iron, aluminum and manganese) in the waste liquid of the lithium iron phosphate battery are agglomerated and precipitated by continuously stirring the mixed solution; and finally, a precipitate is filtered and separated to obtain a lithium carbonate solution. However, in most of the existing operating devices, the mixed solution of the waste liquid of the lithium iron phosphate battery and other chemical solutions needs to be stirred manually, then other metal elements are waited to agglomerate and precipitate, and are filtered layer by layer to obtain the lithium carbonate solution.

The overall operation is complicated with a long extraction time, and cannot satisfy a demand of conveniently extracting lithium from the waste liquid of the lithium iron phosphate battery.

SUMMARY

The object of the present application is to provide a stirring mechanism for extracting lithium from a waste liquid of a lithium iron phosphate battery, so as to solve the problems in the background above.

In order to achieve the object above, the technical solutions of the present disclosure are as follows: a stirring mechanism for extracting lithium from a waste liquid of a lithium iron phosphate battery includes a pedestal, a clamping jaw and a stirring mechanism; the clamping jaw is movably connected to both ends of the pedestal; the pedestal is provided with a supporting rack at a bottom portion, and the stirring mechanism is rotatably arranged in a center of the supporting rack and extending to a bottom portion of the supporting rack; the stirring mechanism includes a first motor, a rotating member and a stirring member; the first motor is fixed in a center of the pedestal; the rotating member is inserted in the center of the supporting rack, and the rotating member includes a second motor, a connecting end and a rotating shaft; the connecting end has an "L"-shaped structure, an included angle between two end portions of the connecting end is obtuse, and one end of the connecting end is connected with an output end of the first motor; the second motor is fixed at a top portion of the other end of the connecting end; the rotating shaft includes an inner shaft and an outer shaft; the outer shaft is connected to a bottom portion of the connecting end below the second motor, and the inner shaft is rotatably arranged in an inner cavity of the outer shaft and connected with an output end of the second motor; the stirring member includes a jaw-shaped connecting base, a separating frame, a material guide wheel and a collecting frame; the jaw-shaped connecting base is connected to an outside lower end of the outer shaft; the separating frame is connected to a bottom end of the jaw-shaped connecting base; the collecting frame is detachably connected with a bottom portion of the separating frame; and the material guide wheel is fixed to a lower end of an inner cavity of the collecting frame and is connected with a bottom end of the inner shaft.

Further, a number of the clamping jaw is no less than three, and the clamping jaw includes a connecting plate and a fixing plate; the connecting plate is movably connected with the fixing plate, and one end of the connecting plate far away from the fixing plate is hinged on the pedestal; and a joint between the connecting plate and the fixing plate and a joint between the connecting plate and the pedestal are both provided with a locking knob for locking the angle.

Furthermore, the fixing plate is provided with an anti-skidding member on one side close to the supporting rack.

Further, a middle section of the rotating shaft is sleeved with a supporting end; and the center of the supporting rack is provided with at least three limiting plates for limiting swing amplitudes of a fixed end, the rotating shaft and the supporting end.

Further, the separating frame is provided with a downwardly depressed hopper-shaped extension portion at a top end, and a gap is formed between the extension portion and the outer shaft; a material guide plate is provided on an outer side of the outer shaft in an inner cavity of the separating frame, and a spiral recess is provided on an outer side wall of the outer shaft at the extension portion above the material guide plate.

Furthermore, the collecting frame includes an inner cylinder, a filter plate and an outer frame; the inner cylinder is located above an inner cavity of the outer frame and coaxially arranged with the outer frame; the filter plate is arranged in a middle portion of the inner cavity of the outer frame and connected with a bottom end of the inner cylinder to divide the outer frame into an upper opening cavity and a lower open cavity; and the upper opening cavity of the outer frame extends below the material guide plate in the separating frame.

Further, the material guide wheel is arranged in the lower opening cavity of the outer frame, and the material guide wheel includes a connecting frame, blades and a baffle which are arranged in sequence; the connecting frame is annular with a channel in a middle; the hook-shaped blades are circumferentially arranged between the connecting frame and the baffle, and a thickness of one end of the blade close to a central point of the connecting frame and the baffle is smaller than that of one end of the blade close to an outer circumference of the connecting frame and the baffle; and a bottom end of the inner shaft passes through the channel of the connecting frame and is connected with the baffle.

Compared with the existing technology, the present disclosure has the following beneficial effects:

(1) According to the present disclosure, by using the obliquely arranged rotating member, the rotating member and the stirring member form a certain angle with a central axis of the container while rotating with the motor, so as to expand a rotating and stirring range of the stirring member, and accelerate fusion between the mixed solutions, so that other metal elements in the waste liquid of the lithium iron phosphate battery are quickly precipitated and separated;

(2) according to the present disclosure, the jaw-shaped connecting base, the separating frame, the material guide wheel and the collecting frame are adopted to form the stirring member, the connecting base, the separating frame and the collecting frame rotate along with the outer shaft of the rotating shaft, and the material guide wheel rotates along with the inter shaft of the rotating shaft, so that the material guide wheel with faster rotating speed can form a suction force at the lower end of the inner cavity of the collecting frame, making the mixed solution quickly enter the inner cavity of the separating frame through the gap between the jaw-shaped connecting base and the separating frame, so that other metal elements precipitated and agglomerated in the waste liquid of the lithium iron phosphate battery can be deposited in the inner cavity of the collecting frame under the action of the flowing solution, thereby achieving the object of separating other metal elements in the waste liquid of the lithium iron phosphate battery and reducing complicated operations and precipitate filtering operations caused by manual stirring;

(3) according to the present disclosure, the specially shaped extension portion and the spiral recess arranged on the outer shaft can accelerate a flow rate of the mixed solution in the gap between the extension portion and the outer shaft, and promote the mixed solution to quickly enter the inner cavity of the separating frame to separate and filter the precipitated metal;

(4) according to the present disclosure, by arranging the material guide plate between the extension portion and the upper opening cavity of the outer frame, a flow path of the mixed solution in the separating frame can be extended through the material guide plate, ensuring that the mixed solution has a certain time for other metal elements to precipitate and agglomerate; and (5) according to the present disclosure, by arranging the adjustable clamping jaw arranged at the bottom portion of the pedestal, an included angle between the connecting plate of the clamping jaw and the pedestal and an included angle between the connecting plate and the fixing plate can be adaptively adjusted according to a size of the bottle opening of the lithium extraction container, and after adjustment, the angle is locked by the locking knob, so that the distance between the clamping jaws can be adaptively adjusted according to the size of the bottle opening of the lithium extraction container, ensuring that the adjusted clamping jaws can realize stable clamping with the bottle opening of the lithium extraction container, thus ensuring the stable use of the rotating member and the stirring member.

In the drawings, the members represented by the reference numerals are listed as follows:

1 refers to pedestal, 2 refers to locking knob, 3 refers to clamping jaw, 31 refers to connecting plate, 32 refers to fixing plate, 4 refers to supporting rack, 41 refers to limiting plate, 5 refers to first motor, 6 refers to rotating member, 61 refers to second motor, 62 refers to connecting end, 63 refers to rotating shaft, 631 refers to inner shaft, 632 refers to outer shaft, 633 refers to material guide plate, 64 refers to supporting end, 7 refers to stirring member, 71 refers to jaw-shaped connecting base, 72 refers to separating frame, 721 refers to extension portion, 73 refers to material guide wheel, 731 refers to connecting frame, 732 refers to blade, 733 refers to baffle, 74 refers to collecting frame, 741 refers to inner cylinder, 742 refers to filter plate, and 743 refers to outer frame.

DETAILED DESCRIPTION

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are intended to explain the present disclosure, but should not be construed as limiting the present disclosure.

Embodiment 1

As shown in FIGS. 1 to 5, a stirring mechanism for extracting lithium from waste liquid of a lithium iron phosphate battery includes a pedestal 1, a clamping jaw 3 and a stirring mechanism. The clamping jaw 3 is movably connected to both ends of the pedestal 1; the pedestal is provided with a supporting rack 4 at a bottom portion, and the stirring mechanism is rotatably arranged in a center of the supporting rack 4 and extending to a bottom portion of the supporting rack 4; where the stirring mechanism includes a first motor 5, a rotating member 6 and a stirring member 7. The first motor 5 is fixed in a center of the pedestal 1. The rotating member 6 is inserted in the center of the supporting rack 4, and the rotating member 6 includes a second motor 61, a connecting end 62 and a rotating shaft 63. The connecting end 62 has an "L"-shaped structure, an included angle between two end portions of the connecting end 62 is obtuse, and one end of the connecting end 62 is connected with an output end of the first motor 5. The second motor 61 is fixed at a top portion of the other end of the connecting end 62. The rotating shaft 63 includes an inner shaft 631 and an outer shaft 632. The outer shaft 632 is connected to a bottom portion of the connecting end 62 below the second motor 61, and the inner shaft 631 is rotatably arranged in an inner cavity of the outer shaft 632 and connected with an output end of the second motor 61. The stirring member 7 includes a jaw-shaped connecting base 71, a separating frame 72, a material guide wheel 73 and a collecting frame 74. The jaw-shaped connecting base 71 is connected to an outside lower end of the outer shaft 632. The separating frame 72 is connected to a bottom end of the jaw-shaped connecting base 71. The collecting frame 74 is detachably connected with a bottom portion of the separating frame 72. The material guide wheel 73 is fixed to a lower end of an inner cavity of the collecting frame 74 and is connected with a bottom end of the inner shaft 631. A storage battery (not shown in the figure) is arranged inside the pedestal 1 for supplying power to the first motor 5 and the second motor 61. The stirring mechanism may be fixed at a bottle opening of a lithium extraction container through the clamping jaw 3, and enables the stirring member 7 be immersed in the waste liquid of the lithium iron phosphate battery inside the lithium extraction container. A rotating speed of the first motor 5 is less than that of the second motor 61, so that the rotating speed after the connecting base 71, the separating frame 72 and the collecting frame 74 are connected, is less than a rotating speed of the material guide wheel 73, thus ensuring that the solution can quickly move to the collecting frame 74 and the material guide wheel 73 after entering the separating frame 72. When rotating, the first motor 5 can drive the connecting end 62 of the rotating member 6 and the outer shaft 632 of the rotating shaft 63 to rotate, so that the connecting base 71, the separating frame 72 and the collecting frame 74 of the stirring member 7 rotate synchronously with the outer shaft 632, and further stir a mixed solution of the waste liquid of the lithium iron phosphate battery and a chemical preparation. Due to the obliquely arranged rotating member 6, the rotating member 6 and the stirring member 7 form a certain angle with a central axis of the container during rotation, so as to expand a rotating and stirring range of the stirring member 7, and accelerate fusion between the mixed solutions, so that other metal elements in the waste liquid of the lithium iron phosphate battery are quickly precipitated and agglomerated. During the rotating of the stirring member 7, due to the special jaw-shaped connecting base 71, sufficient gap can be left between the jaw-shaped connecting base 71 and the separating frame 72 after the two are connected. Therefore, when rotating, the second motor 61 may drive the inner shaft 631 and the material guide wheel 73 to rotate, and the material guide wheel 73 with a faster rotating speed may form a suction force at the lower end of the inner cavity of the collecting frame 74, so that the mixed solution can quickly enter the inner cavity of the separating frame 72 through the gap between the jaw-shaped connecting base 71 and the separating frame 72, so that other metal elements precipitated and agglomerated in the waste liquid of the lithium iron phosphate battery can be deposited in the inner cavity of the collecting frame 74 under the action of the flowing solution, thereby achieving the object of separating other metal elements in the waste liquid of the lithium iron phosphate battery and reducing complicated operations and precipitate filtering operations caused by manual stirring.

Figure 1:
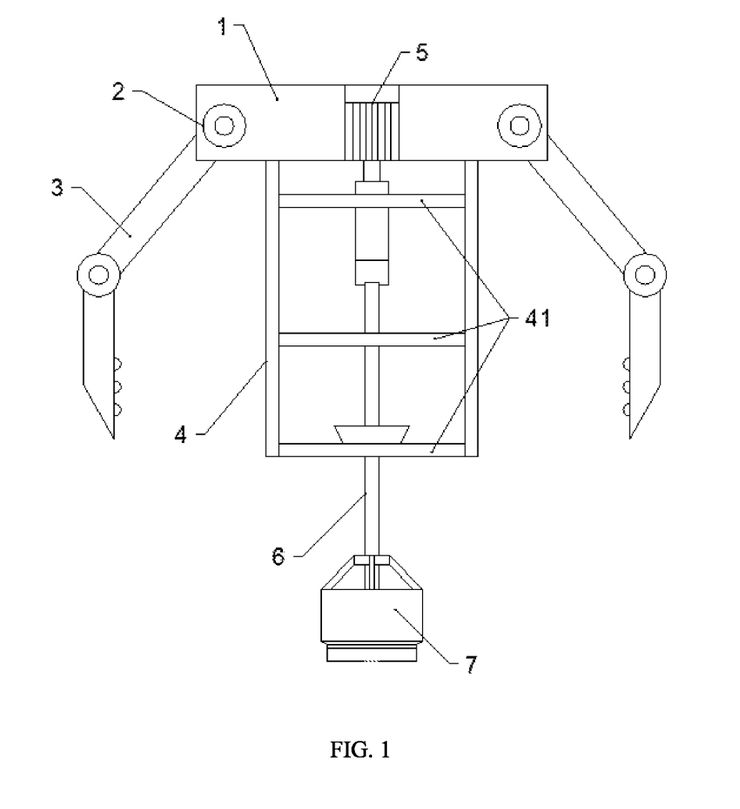
FIG. 1 is a schematic diagram of a side view of the present disclosure.
Figure 2:
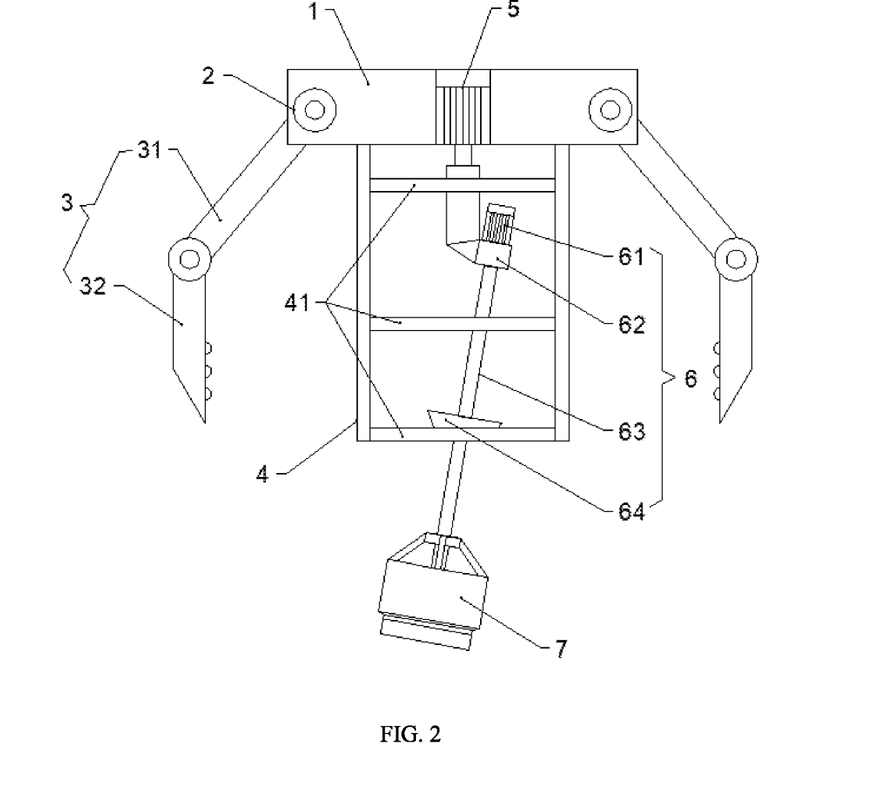
FIG. 2 is a schematic diagram of a front view structure of the present disclosure.

As shown in FIGS. 1 and 2, in this embodiment, a number of the clamping jaw 3 is no less than three, and the clamping jaw 3 includes a connecting plate 31 and a fixing plate 32. The connecting plate 31 is movably connected with the fixing plate 32, and one end of the connecting plate 31 far away from the fixing plate 32 is hinged on the pedestal 1. A joint between the connecting plate 31 and the fixing plate 32 and a joint between the connecting plate 31 and the pedestal 1 are both provided with a locking knob 2 for locking the angle. In this embodiment, the fixing plate 32 is provided with an anti-skidding member on one side close to the supporting rack 4. The number of the clamping jaw 3 is preferably four, and the four clamping jaws 3 are arranged around a periphery of the bottom portion of the pedestal 1 at equal intervals to ensure that the pedestal 1 can have good clamping stability when connected with the lithium extraction container through the clamping jaws 3. An included angle between the connecting plate 31 and the pedestal 1 and an included angle between the connecting plate 31 and the fixing plate 32 can be adaptively adjusted according to a size of a bottle opening of the lithium extraction container, and after adjustment, the angle is locked by the locking knob 2, so that the distance between the clamping jaws 3 can be adaptively adjusted according to the size of the bottle opening of the lithium extraction container, and the adjusted clamping jaws 3 can realize stable clamping with the bottle opening of the lithium extraction container. The anti-skidding member may be a rubber pad with anti-slip protrusions, which can not only ensure the anti-slip property of the fixing plate 32 and a side wall of the bottle opening of the lithium extraction container, but also avoid the wear of the fixing plate 32 when clamping the side wall of the lithium extraction container.

Figure 3:
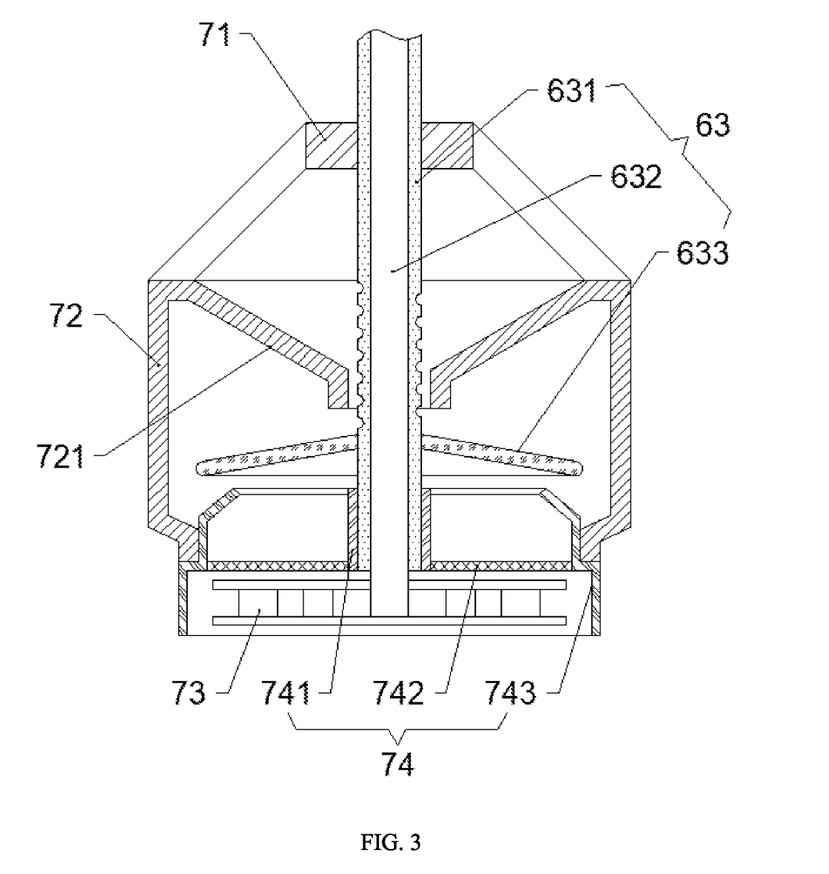
FIG. 3 is a schematic structural diagram of a cross section of a stirring member of the present disclosure.

As shown in FIGS. 2 and 3, in this embodiment, a middle section of the rotating shaft 63 is sleeved with a supporting end 64; the center of the supporting rack 4 is provided with at least three limiting plates 41 for limiting swing amplitudes of a fixed end 61, the rotating shaft 63 and the supporting end 64; where a number of the limiting plate 41 is preferably three. When the fixed end 61 is connected with the rotating shaft 63, an angle of the rotating shaft 63 can be changed by the specially shaped connecting end 62, so the stirring member 7 connected to the bottom portion of the rotating shaft 63 may also be inclined, which may change the angles between the rotating member 6 and the stirring member 7 and a central axis of the lithium extraction container, and ensure that a larger stirring range can be obtained when the motor 5 drives the rotating member 6 and the stirring member 7 to rotate. The arrangement of the supporting end 64 can realize the connection between the rotating member 6 and the limiting plate 41, which can better ensure the stability of the rotating member 6 when rotating, and ensure that the rotating member 6 can drive the stirring member 7 to rotate and swing at a certain angle.

Figure 4:
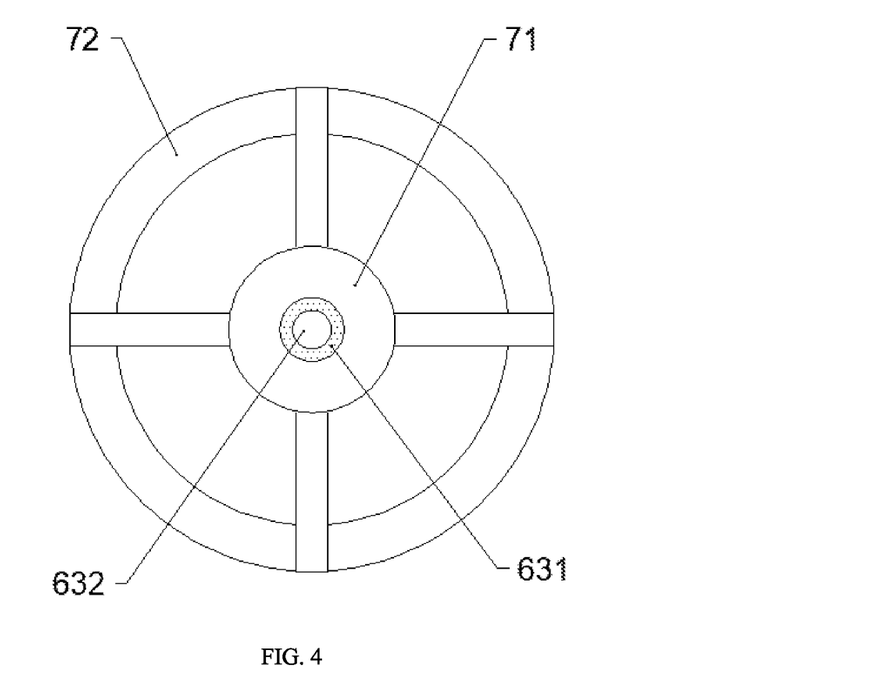
FIG. 4 is a schematic structural diagram of a top view of the stirring member of the present disclosure.
Figure 5:
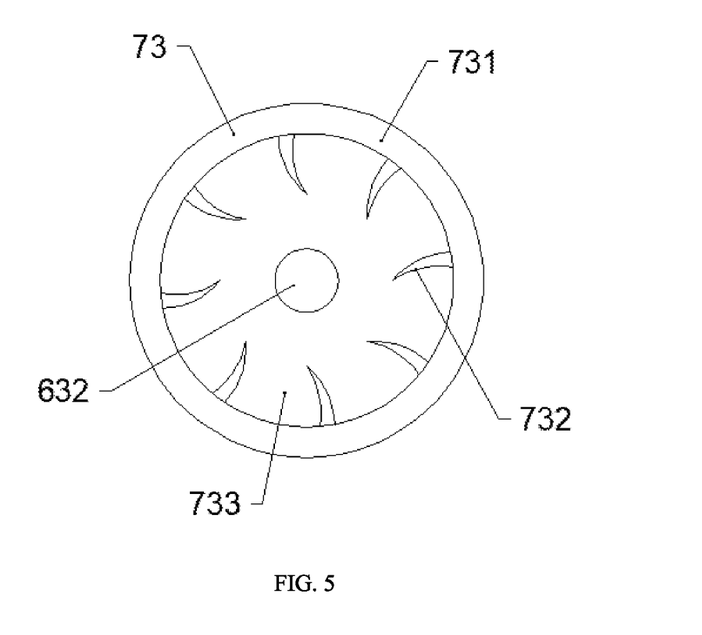
FIG. 5 is a schematic structural diagram of a top view of a material guide wheel of the present disclosure.

As shown in FIGS. 3 and 4, in this embodiment, the separating frame 72 is provided with a downwardly depressed hopper-shaped extension portion 721 at a top end, and a gap is formed between the extension portion 721 and the outer shaft 632. A material guide plate 633 is provided on an outer side of the outer shaft 632 in an inner cavity of the separating frame 72, and a spiral recess (not marked in the figure) is provided on an outer side wall of the outer shaft 632 at the extension portion 721 above the material guide plate 633. In this embodiment, the collecting frame 74 includes an inner cylinder 741, a filter plate 742 and an outer frame 743. The inner cylinder 741 is located above an inner cavity of the outer frame 743 and coaxially arranged with the outer frame 743. The filter plate 742 is arranged in a middle portion of the inner cavity of the outer frame 743 and connected with a bottom end of the inner cylinder 741 to divide the outer frame 743 into an upper opening cavity and a lower open cavity. The upper opening cavity of the outer frame 743 extends below the material guide plate 633 in the separating frame 72. In this embodiment, the material guide wheel 73 is arranged in the lower opening cavity of the outer frame 743, and the material guide wheel 73 includes a connecting frame 731, blades 732 and a baffle 733 which are arranged in sequence. The connecting 731 is annular with a channel in the middle. The hook-shaped blades 732 are circumferentially arranged between the connecting frame 731 and the baffle 733, and a thickness of one end of the blade 732 close to a central point of the connecting frame 731 and the baffle 733 is smaller than that of one end of the blade 732 close to an outer circumference of the connecting frame 731 and the baffle 733. A bottom end of the inner shaft 631 passes through the channel of the connecting frame 731 and is connected with the baffle 733. A middle upper portion of the outer frame 743 may be spirally connected to the bottom end of the separating frame 72, so that the separating frame 72 and the collecting frame 74 can be conveniently disassembled, which is beneficial to the disassembling and cleaning of the stirring member 7. The specially shaped extension portion 721 and the spiral recess arranged on the outer shaft 632 can accelerate a flow rate of the mixed solution in the gap between the extension portion 721 and the outer shaft 632, and promote the mixed solution to quickly enter the inner cavity of the separating frame 72. The inner cylinder 741 may be used for assembly guidance between the collecting frame 74 and the outer shaft 632, ensuring that the collecting frame 74 can be positioned by the outer shaft 632 when it is spirally assembled into the bottom end of the separating frame 72. The filter plate 742 arranged in the center of the collecting frame 74 can effectively isolate other metal elements precipitated and agglomerated in the waste liquid of the lithium iron phosphate battery, and ensure that other metal elements precipitated and agglomerated can be separated from the lithium carbonate solution and collected in the collecting frame 74. The material guide plate 633 arranged between the extension portion 721 and the upper opening cavity of the outer frame 743 can extend a flow path of the mixed solution in the separating frame 72, ensuring that the mixed solution has a certain time for other metal elements to precipitate and agglomerate. When the specially shaped material guide wheel 73 rotates synchronously with the inner shaft 631, the solution flowing from the upper opening cavity of the collecting frame 74 to the lower opening cavity of the collecting frame 74 may pass through the channel of the connecting frame 731 and reach the blades 732. Because the baffle 733 blocks the flow of the solution, the solution may be guided by the blades 732 and circumferentially spread along an outer circumferential direction of the material guide wheel 73, and move downwards under the block of the outer frame 743 at the lower end of the collecting frame 74, further promoting the flow of the solution by the way of secondary acceleration blocking, and accelerating a mixing effect of the waste liquid of the lithium iron phosphate battery and the chemical preparation.

To sum up, according to the stirring mechanism for extracting lithium from the waste liquid of the lithium iron phosphate battery provided by the present disclosure, by using the obliquely arranged rotating member 6, the rotating member 6 and the stirring member 7 form a certain angle with a central axis of the container during rotation while rotating with the motor 5, so as to expand a rotating and stirring range of the stirring member 7, and accelerate fusion between the mixed solutions, so that other metal elements in the waste liquid of the lithium iron phosphate battery are quickly precipitated and agglomerated. The specially shaped stirring member 7 can make the solution reach the extension portion 721 of the separating frame 72, and quickly enter the inner cavity of the separating frame 72 under the action of the suction force generated by the rotation of the material guide wheel 73, so that other metal elements precipitated from the waste liquid of the lithium iron phosphate battery can be precipitated in the inner cavity of the collecting frame 74 under the action of the flowing solution, thus achieving the object of separating other metal elements from the waste liquid of the lithium iron phosphate battery.

In the descriptions of the specification, the descriptions with reference to the terms "one embodiment", "some embodiments", "example", "specific example" or "some examples", etc., refer to that specific features, structures, materials, or characteristics described with reference to the embodiments or examples are included in at least one embodiment or example of the present disclosure. In the specification, the schematic representation of the above terms should not be understood as necessarily referring to the same embodiment or example. Moreover, the specific features, structures, materials or characteristics described may be combined in any one or more embodiments or examples in a suitable manner. In addition, those skilled in the art may join and combine different embodiments or examples described in the specification.

Although the embodiments of the present disclosure have been shown and described above, it may be understood that the above embodiments are exemplary and cannot be understood as limiting the present disclosure, and those of ordinary skills in the art may make changes, modifications, substitutions and variations to the above embodiments within the scope of the present disclosure.

The invention claimed is:

1. A stirring apparatus for extracting lithium from a waste liquid of a lithium iron phosphate battery, comprising a pedestal (1), a clamping jaw (3) and a stirring mechanism; the clamping jaw (3) being movably connected to both ends of the pedestal (1), a supporting rack (4) being provided at a bottom portion of the pedestal (1), and the stirring mechanism being rotatably arranged in a center of the supporting rack (4) and extending to a bottom portion of the supporting rack (4); wherein the stirring mechanism comprises a first motor (5), a rotating member (6) and a stirring member (7); the first motor (5) is fixed in a center of the pedestal (1); the rotating member (6) is inserted in the center of the supporting rack (4), and the rotating member (6) comprises a second motor (61), a connecting end (62) and a rotating shaft (63); the connecting end (62) has an "L"-shaped structure, an included angle between two end portions of the connecting end (62) is obtuse, and one end of the connecting end (62) is connected with an output end of the first motor (5); the second motor (61) is fixed at a top portion of the other end of the connecting end (62); the rotating shaft (63) comprises an inner shaft (631) and an outer shaft (632); the outer shaft (632) is connected to a bottom portion of the connecting end (62) below the second motor (61), and the inner shaft (631) is rotatably arranged in an inner cavity of the outer shaft (632) and connected with an output end of the second motor (61); the stirring member (7) comprises a jaw-shaped connecting base (71), a separating frame (72), a material guide wheel (73) and a collecting frame (74); the jaw-shaped connecting base (71) is connected to an outside lower end of the outer shaft (632); the separating frame (72) is connected to a bottom end of the jaw-shaped connecting base (71); the collecting frame (74) is detachably connected with a bottom portion of the separating frame (72); and the material guide wheel (73) is fixed to a lower end of an inner cavity of the collecting frame (74) and is connected with a bottom end of the inner shaft (631).

2. The stirring apparatus for extracting lithium from the waste liquid of the lithium iron phosphate battery according to claim 1, wherein a number of the clamping jaw (3) is no less than three, and the clamping jaw (3) comprises a connecting plate (31) and a fixing plate (32); the connecting plate (31) is movably connected with the fixing plate (32), and one end of the connecting plate (31) far away from the fixing plate (32) is hinged on the pedestal (1); and a joint between the connecting plate (31) and the fixing plate (32) and a joint between the connecting plate (31) and the pedestal (1) are both provided with a locking knob (2) for locking the angle.

3. The stirring apparatus for extracting lithium from the waste liquid of the lithium iron phosphate battery according to claim 2, wherein an anti-skidding member is provided on one side of the fixing plate (32) close to the supporting rack.

4. The stirring apparatus for extracting lithium from the waste liquid of the lithium iron phosphate battery according to claim 1, wherein a middle section of the rotating shaft (63) is sleeved with a supporting end (64); and the center of the supporting rack (4) is provided with at least three limiting plates (41) for limiting swing amplitudes of the second motor (61), the rotating shaft (63) and the supporting end (64).

5. The stirring apparatus for extracting lithium from the waste liquid of the lithium iron phosphate battery according to claim 1, wherein a downwardly depressed hopper-shaped extension portion (721) is provided at a top end of the separating frame (72), and a gap is formed between the extension portion (721) and the outer shaft (632); and a material guide plate (633) is provided on an outer side of the outer shaft (632) in an inner cavity of the separating frame (72), and a spiral recess is provided on an outer side wall of the outer shaft (632) at the extension portion (721) above the material guide plate (633).

6. The stirring apparatus for extracting lithium from the waste liquid of the lithium iron phosphate battery according to claim 5, wherein the collecting frame (74) comprises an inner cylinder (741), a filter plate (742) and an outer frame (743); the inner cylinder (741) is located above an inner cavity of the outer frame (743) and coaxially arranged with the outer frame (743); the filter plate (742) is arranged in a middle portion of the inner cavity of the outer frame (743) and connected with a bottom end of the inner cylinder (741) to divide the outer frame (743) into an upper opening cavity and a lower opening cavity; and the upper opening cavity of the outer frame (743) extends to a bottom of the material guide plate (633) in the separating frame (72).

7. The stirring apparatus for extracting lithium from the waste liquid of the lithium iron phosphate battery according to claim 6, wherein the material guide wheel (73) is arranged in the lower opening cavity of the outer frame (743), and the material guide wheel comprises a connecting frame (731), blades (732) and a baffle (733) which are arranged in sequence; the connecting frame (731) is annular with a channel in a middle; the blades (732) are hook-shaped and circumferentially arranged between the connecting frame (731) and the baffle (733), and a thickness of one end of the blade (732) close to a central point of the connecting frame (731) and the baffle (733) is less than that of one end of the blade (732) close to an outer circumference of the connecting frame (731) and the baffle (733); and the bottom end of the inner shaft (631) passes through the channel of the connecting frame (731) and is connected with the baffle (733).

8. The stirring apparatus for extracting lithium from the waste liquid of the lithium iron phosphate battery according to claim 2, wherein a middle section of the rotating shaft (63) is sleeved with a supporting end (64); and the center of the supporting rack (4) is provided with at least three limiting plates (41) for limiting swing amplitudes of the second motor (61), the rotating shaft (63) and the supporting end (64).

9. The stirring apparatus for extracting lithium from the waste liquid of the lithium iron phosphate battery according to claim 3, wherein a middle section of the rotating shaft (63) is sleeved with a supporting end (64); and the center of the supporting rack (4) is provided with at least three limiting plates (41) for limiting swing amplitudes of the second motor (61), the rotating shaft (63) and the supporting end (64).

10. The stirring apparatus for extracting lithium from the waste liquid of the lithium iron phosphate battery according to claim 2, wherein a downwardly depressed hopper-shaped extension portion (721) is provided at a top end of the separating frame (72), and a gap is formed between the extension portion (721) and the outer shaft (632); and a material guide plate (633) is provided on an outer side of the outer shaft (632) in an inner cavity of the separating frame (72), and a spiral recess is provided on an outer side wall of the outer shaft (632) at the extension portion (721) above the material guide plate (633).

11. The stirring apparatus for extracting lithium from the waste liquid of the lithium iron phosphate battery according to claim 3, wherein a downwardly depressed hopper-shaped extension portion (721) is provided at a top end of the separating frame (72), and a gap is formed between the extension portion (721) and the outer shaft (632); and a material guide plate (633) is provided on an outer side of the outer shaft (632) in an inner cavity of the separating frame (72), and a spiral recess is provided on an outer side wall of the outer shaft (632) at the extension portion (721) above the material guide plate (633).

12. The stirring apparatus for extracting lithium from the waste liquid of the lithium iron phosphate battery according to claim 10, wherein the collecting frame (74) comprises an inner cylinder (741), a filter plate (742) and an outer frame (743); the inner cylinder (741) is located above an inner cavity of the outer frame (743) and coaxially arranged with the outer frame (743); the filter plate (742) is arranged in a middle portion of the inner cavity of the outer frame (743) and connected with a bottom end of the inner cylinder (741) to divide the outer frame (743) into an upper opening cavity and a lower opening cavity; and the upper opening cavity of the outer frame (743) extends to a bottom of the material guide plate (633) in the separating frame (72).

13. The stirring apparatus for extracting lithium from the waste liquid of the lithium iron phosphate battery according to claim 12, wherein the material guide wheel (73) is arranged in the lower opening cavity of the outer frame (743), and the material guide wheel comprises a connecting frame (731), blades (732) and a baffle (733) which are arranged in sequence; the connecting frame (731) is annular with a channel in a middle; the blades (732) are hook-shaped and circumferentially arranged between the connecting frame (731) and the baffle (733), and a thickness of one end of the blade (732) close to a central point of the connecting frame (731) and the baffle (733) is less than that of one end of the blade (732) close to an outer circumference of the connecting frame (731) and the baffle (733); and the bottom end of the inner shaft (631) passes through the channel of the connecting frame (731) and connected with the baffle (733).

14. The stirring apparatus for extracting lithium from the waste liquid of the lithium iron phosphate battery according to claim 11, wherein the collecting frame (74) comprises an inner cylinder (741), a filter plate (742) and an outer frame (743); the inner cylinder (741) is located above an inner cavity of the outer frame (743) and coaxially arranged with the outer frame (743); the filter plate (742) is arranged in a middle portion of the inner cavity of the outer frame (743) and connected with a bottom end of the inner cylinder (741) to divide the outer frame (743) into an upper opening cavity and a lower opening cavity; and the upper opening cavity of the outer frame (743) extends to a bottom of the material guide plate (633) in the separating frame (72).

15. The stirring apparatus for extracting lithium from the waste liquid of the lithium iron phosphate battery according to claim 14, wherein the material guide wheel (73) is arranged in the lower opening cavity of the outer frame (743), and the material guide wheel comprises a connecting frame (731), blades (732) and a baffle (733) which are arranged in sequence; the connecting frame (731) is annular with a channel in a middle; the blades (732) are hook-shaped and circumferentially arranged between the connecting frame (731) and the baffle (733), and a thickness of one end of the blade (732) close to a central point of the connecting frame (731) and the baffle (733) is less than that of one end of the blade (732) close to an outer circumference of the connecting frame (731) and the baffle (733); and the bottom end of the inner shaft (631) passes through the channel of the connecting frame (731) and connected with the baffle (733).

\* \* \* \* \*